United States Patent
Snoy et al.

[15] 3,667,501
[45] June 6, 1972

[54] SELECTOR VALVE ASSEMBLY WITH MECHANICAL LATCH

[72] Inventors: Joseph B. Snoy; Bradford K. Shull, both of Rockford, Ill.

[73] Assignee: Twin Disc, Incorporated, Racine, Wis.

[22] Filed: Dec. 30, 1970

[21] Appl. No.: 102,780

[52] U.S. Cl.................137/612.1, 251/73, 137/596.16, 137/624.27
[51] Int. Cl.................................................F16k 11/20
[58] Field of Search..............251/73, 94; 137/612.1, 624.27, 137/596.16

[56] References Cited

UNITED STATES PATENTS 3,381,933  5/1968  Derhammer..........................251/73

*Primary Examiner*—Henry T. Klinksiek
*Attorney*—James E. Nilles

[57] ABSTRACT

A selector valve assembly for use with power shift transmissions to select various operating speed ranges, and of the type having a plurality of shiftable hydraulic spools. The assembly includes a mechanical latch plate for holding the selected spools in an extended, operative position. A neutral piston is provided for engagement with the latch plate to urge the latter to the piston releasing position to thereby disengage the spools.

11 Claims, 9 Drawing Figures

PATENTED JUN 6 1972

INVENTORS:
Joseph B. Snoy
Bradford K. Shull

BY: James E. Nilles
ATTORNEY

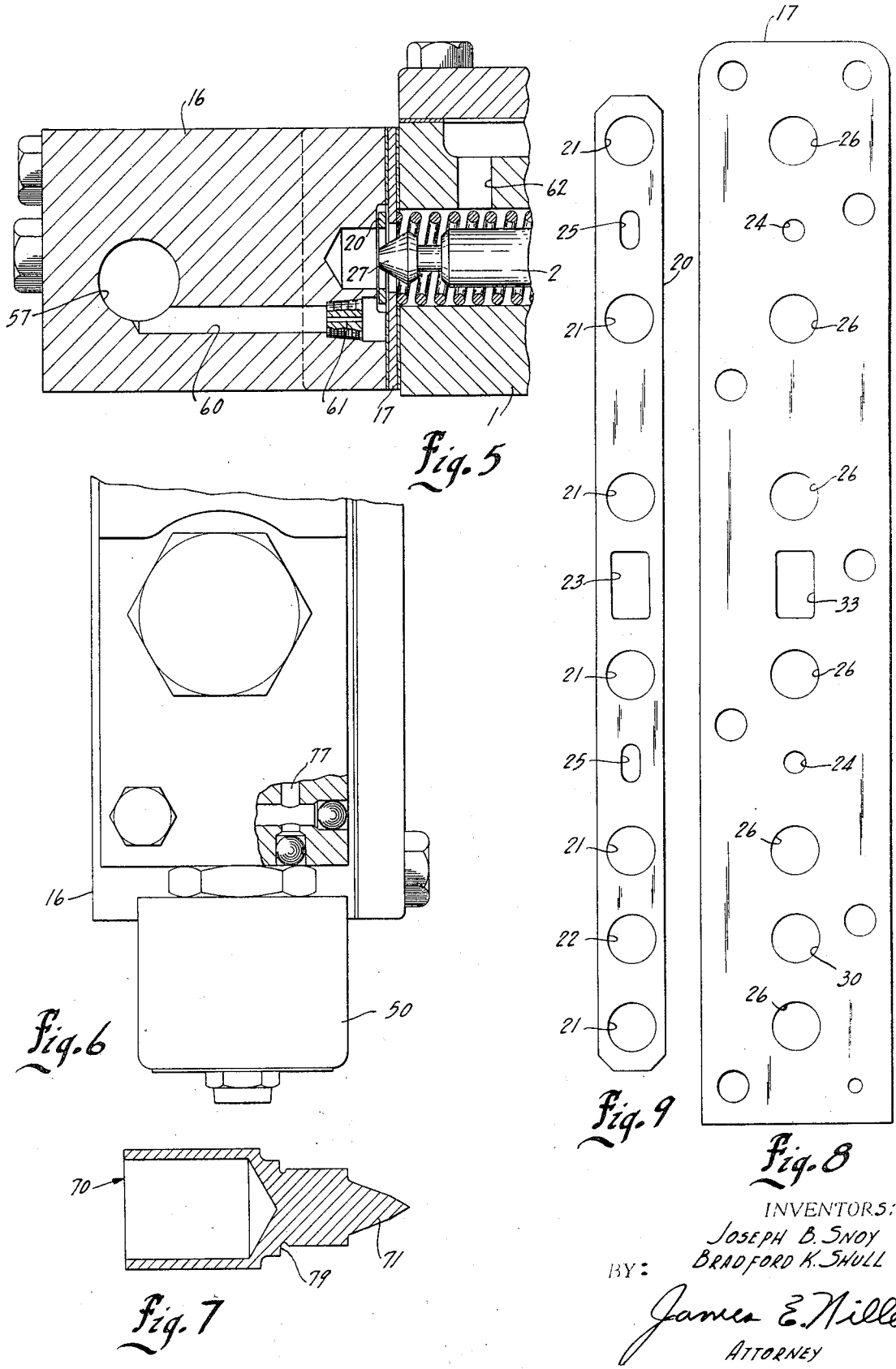

3,667,501

SELECTOR VALVE ASSEMBLY WITH MECHANICAL LATCH

BACKGROUND OF THE INVENTION

The invention pertains to fluid operated control systems for transmissions in which a plurality of hydraulic spools are used to selectively engage the various clutches of the transmission to effect speed changes.

The invention finds particular utility when used with a transmission of the type shown in the United States co-pending application, Ser. No. 54,316, filed July 13, 1970, and entitled "Power Transmission Having Downshift Inhibitor," which issued on Oct. 19, 1971 as U.S. Pat. No. 3,613,480 and is assigned to an assignee common with the present invention.

SUMMARY OF THE INVENTION

The present invention provides a selector valve assembly having a plurality of extendable valve spools for directing pressure fluid to various clutches, the assembly having a slideable latch plate for holding the spools in the extended position. The assembly also has a neutral piston for urging the latch plate to the neutral position whereby any of the spools can be returned to their contracted position. Means are also provided for the neutral piston for actuating the latter and urging it to said neutral, latch neutralizing position.

The above assembly provided by the present invention insures that when a vehicle is shut down while in gear, the neutral piston forces all engaged selector valves to the disengaged position. Furthermore, when in the neutral position, a neutral solenoid for actuating the neutral piston causes the latter to shift to the neutralizing position, thereby disengaging all selector valves. In addition, while the transmission is in any speed range position, the various selector spools that have been engaged cannot be disengaged unless another range is selected, the vehicle power is turned off, or the hydraulic supply of fluid to the transmission ceases as for example, when the hydraulic pump fails.

These and other objects and advantages of the present invention will appear hereinafter as this disclosure progresses, reference being had to the accompanying drawings.

BRIEF DESCRIPTION OF THE DRAWINGS

FIG. 1 is a view of a neutral hydraulic piston and valve body embodying the present invention, certain parts being shown as broken away or in sction for clarity;

FIG. 2 is a sectional view taken along line 2—2 in FIG. 1;

FIG. 3 is a sectional view taken along line 3—3 in FIG. 1;

FIG. 4 is a sectional view taken along line 4—4 in FIG. 1, but showing the spool of the valve in an engaged position;

FIG. 5 is a sectional view taken along line 5—5 in FIG. 1;

FIG. 6 is an end view taken generally along line 6—6 in FIG. 1, and showing a certain portion being broken away and in section for clarity;

FIG. 7 is a cross sectional view of the shiftable neutral piston shown in FIG. 1;

FIG. 8 is a view of the spring retainer plate shown in FIG. 1;

FIG. 9 is a view of the locking plate for the spools and which is also shown in other views.

DESCRIPTION OF A PREFERRED EMBODIMENT

An elongated valve body 1 is provided for holding any number of shiftable hydraulic valve spools 2, the spools being actuated by electric solenoids 3. The solenoids 3 include a shiftable face valve 4 which is adapted to abut against a nose piece 5 having an orifice 6 therethrough. Main line fluid pressure is supplied to each of the bores 7 in which the shiftable spools 2 are reciprocable. More specifically, this main fluid pressure is introduced via passage means 10, and is always available to each of the bores 7 and to the end of the spools, via passage 10a (FIG. 4) and the conventional conical filter screen 10b. The arrangement is such that each spool is shifted due to pressure at 10c when its solenoid is energized, to thereby direct main line fluid pressure to its specific clutch (not shown) of a transmission. Space 10c is vented to the sump passage 62 via orifice 10d in plug 10e. The valve spools 2 as shown in FIG. 1 are in the disengaged position, and the spool 2 is shown in the engaged position in FIG. 4.

If a more complete description of the function of the valves in shifting their respective clutches is deemed to be either necessary or desirable, reference may be had to the said U.S. Pat. No. 3,613,480.

A cover 16 is provided for the housing and a spring retainer plate 17 is fixed between the cover 16 and housing. A series of cap bolts 18 hold the cover and plate 17 securely on the housing. The cover has a slot 19 extending adjacent the plate 17, and a slide latch plate 20 is slideable therein. The latch plate 20 has a series of holes 21, one for each valve spool 2, and also has an opening 22 and a rectangular opening 23.

The spring retainer plate 17 has a series of apertures 26 extending therethrough, one for each of the tapered noses 27 of the spools 2. The plate 17 also has another aperture 30, for a purpose that will hereinafter appear, and a rectangular opening 33.

A coil spring 32 is located in the rectangular openings 23 and 33 and acts to bias the slideable latch plate 20 in a downward direction (as viewed in FIG. 1), namely to a position in which the apertures 21 of the latch 20 are in alignment with the apertures 26 of the spring retainer plate 17. When in this position, aperture 22 in the latch plate 20 is also in alignment with the aperture 30 of the spring retainer plate 17.

Roll pins 36 extend through the small holes 24 in plate 17 and through the slots 25 in sliding latch 20 act to guide the latter in its sliding movement.

The valve spools 2 are each biased by their spring 40 to the disengaged position and when in that position, their tapered nose 27 is retracted from the latch plate 20. However, when the valve spool 2 is shifted, due to energization of the solenoid, the tapered nose forces plate 20 to shift against its spring 32 and through its respective apertures 21 and 26 in the plates 20 and 17, so that the reduced neck portion 41 of the spool is held by the latching plate 20 when the latter is again moved downwardly to a locking position due to the action of the coil spring 32. In this manner, the selected spools 2, which have been extended by their solenoids, are held in the engaged position by the latch plate 20.

A neutral, electrically operated solenoid 50 is also mounted in the end cover 16 and has a shiftable valve plate 51 which is adapted to abut against and close an orifice 52 of its nose piece 53 when solenoid 50 is deenergized, and thereby prevents pressure fluid from flowing through the orifice. It will be noted that a passage 55 places the bores 7 of the housing 1 in communication with the area 56 adjacent the orifice 52. Thus, when the solenoid 50 is energized, pressure fluid can flow through passage 55 through orifice 52 and into area 57. When the solenoid 50 is de-energized, its valve plate 51 closes orifice 52 and prevents fluid pressure from entering area 57.

Another fluid passage 60 having an orifice 61 (FIG. 5) places area 57 in fluid communication with the end of bore 7 and sump passage 62.

Also mounted in the cover 16 and adjacent the neutral solenoid 50 is a shiftable neutral piston 70 (shown clearly in FIG. 7) which has a tapered nose 71 that is adapted to protrude through the holes 30 and 22 in plates 17 and 20, respectively. When the tapered nose 51 is in the position shown in FIG. 1, it forces the latch plate 20 upwardly to a neutral position, thereby allowing each of the spools 2 to be retracted to the disengaging position due to the action of their respective springs 40. On the other hand, when the neutral piston 70 is retracted to the left as viewed in FIG. 1, its nose is retracted from the latch plate 20, allowing the spring 32 to again bias the latch plate to a downward direction in which it can hold spools 2 captive if they are extended.

It will be noted that area 57 is in communication with the bore 74 in which the piston 70 slides and therefore, when fluid pressure is permitted to enter the area in bore 74 behind the piston 70, this pressure urges the piston 70 to the right, namely to the latch 20 neutralizing position. Spring 75 also acts to urge the piston 70 to this latch neutralizing position. A vent passage 76 (FIG. 1) vents the space 76a adjacent the nose 71 to sump passage 62 (FIGS. 1 and 4).

Another fluid passage 77 places the high pressure passage 55 in communication with the front end of the spool 70, namely, in the area 78. When the fluid pressure is admitted to the area 78, it acts on the shoulder 79 of the piston, thereby urging it to the left, namely a position in which the nose 71 is withdrawn from the latch plate 20.

Thus, the latch plate 20 is held in an upward or neutral position (FIG. 1) by the conical end 71 of the neutral piston 70 and in this position all of the clutch spools 2 are released and in the position shown in FIG. 1.

The general operation of the mechanism is as follows. When the vehicle (not shown), on which the invention is used, is not in operation, the various parts are in the position shown in FIG. 1. After the vehicle engine (not shown) is started, main line fluid pressure, say at about 200 psi, is present in passageway 10 at each of the clutch spool bores 7. This main line fluid pressure is also directed from passage 10 through passage 55 in the valve body 1 and to the neutral solenoid chamber 56. Additionally, this main line fluid pressure is directed through passage 77 and acts on piston 70 in the chamber 78, thereby forcing the neutral piston 70 to the left as viewed in the drawings and against the action of the spring 75.

In the event the transmission range selector (not shown) is in neutral, as it should be when the engine of the vehicle is started, the neutral solenoid 50 would be energized, thereby opening orifice 52 and permitting main fluid pressure to pass through the orifice 52 of the solenoid nose piece 53, thereby filling the volume behind the neutral spool in the bore 74 and consequently force the piston 70 to move to the right, thereby forcing the latch plate 20 to shift upwardly into the position shown in FIG. 1.

After the transmission of the vehicle has been shifted to a range position, the solenoid 50 is de-energized, and armature face valve 51 then covers the orifice 52 in the nose piece 53 and prevents flow of fluid pressure through it. The main line pressure fluid in passage 77 then acts on neutral piston 70 and moves it to the left, thereby compressing its spring 75 and forcing fluid pressure in the passage 60 through orifice 61 (FIG. 5) and to the sump passage 62. At the same time, the neutral piston 70 is being disengaged, and one or more of the range solenoids 3 are energized, causing its armature face valve 4 (FIG. 4) to move and allow main fluid pressure to pass through the orifice 6 in its nose piece 5 and apply fluid force to its spool 2, thereby shifting it against its compression spring 40. The tapered nose 27 of spool 2 forces the latch slide 20 to shift, compressing its spring 32. Then the spool 2 moves until its end is bottomed in the hole 80. Spring 32 forces the latch plate 20 to shift until it strikes the small diameter 41 of the spool, locking it in position. The latch plate 20 is thus in the loaded position and will function to keep the spool 2 engaged if electrical failure occurs. In order to get the engaged spool 2 out of engagement, it is necessary to either engage another range spool 2, engage the neutral solenoid 50, or shut off the vehicle completely.

Thus, the above mechanical latch plate means provides a safety device for certain types of vehicle operation. In other words, in the event of an electrical failure, the spools are mechanically held engaged and the transmission is kept from inadvertently going to neutral.

Furthermore, if the vehicle is shut off while the transmission is in a gear range, the spring loaded piston 70 moves to force the latch plate 20 to the release position, thereby releasing any of the engaged spools 2 so that the transmission will go to neutral. This prevents the possibility of the vehicle starting up while being in a gear range and of course, prevents lunging of the vehicle or other malfunction.

The system provided by the present invention provides a positive neutral. The separate neutral solenoid 50 is provided in the cover 16 and is engaged when neutral is desired. This solenoid 50 allows pressure fluid to aid the spring 75 against an opposing and smaller hydraulic force (in chamber 78) on the piston 70, to thereby provide this positive neutral. In other words, the piston 70 moves to the right as viewed in FIG. 1, causing its tapered end 71 to force the latch plate 20 to the upward, release position in which all of the spools 2 that are no longer mechanically held and are then released.

We claim:

1. A selector valve assembly comprising, a valve housing, a plurality of extendable valve spools mounted in said housing for directing pressure fluid to various outlets, a slideable latch plate in said housing and having an aperture adjacent the end of each of said shiftable spools, said spools each having a tapered end insertable through said spools' respective aperture in said plate when said spools are extended, means acting on and for resiliently biasing said latch plate to a position in which said apertures are not in complete registry with said spools and said plate engages and holds captive said extended spools, said latch plate having another aperture , a shiftable neutral piston having a nose portion adapted to enter said another aperture in said latch plate for forcing the latter to a neutral position against said biasing means where said latch plate apertures are in registry with their respective shiftable spools to thereby permit the said tapered ends to be withdrawn from said apertures in said latch plate, a high pressure fluid passage means in said housing for providing pressure fluid to each of said shiftable spools, second passage means placing said high pressure passage means in fluid communication with one end of said neutral piston whereby pressure fluid acts to shift said neutral piston to said neutral position for said shifting of said latch plate, and shiftable valve means in said second passage means, means in said housing for opening said shiftable valve means to open said second passage means to permit high pressure fluid to shift said neutral piston , said third passage means between said high pressure fluid passage means with the other end of said neutral piston to urge the latter to a position in which said neutral piston nose portion is withdrawn from said latch plate.

2. An assembly set forth in claim 1 further characterized in that said means for opening said shiftable valve means is an electrically operated solenoid connected with said valve housing.

3. The valve assembly set forth in claim 2 including an exhaust fluid passage placing said one end of said neutral piston in fluid communication with a sump, whereby pressure fluid may be relieved from one end of said neutral piston.

4. The valve assembly set forth in claim 3 further characterized in that said extendable valve spools also have a shoulder adjacent said tapered end for engagement by said latch plate to hold said extended spool captive in said latch plate.

5. The valve assembly described in claim 4 including resilient means acting on said neutral piston for biasing its nose portion into engagement with said latch plate to shift the latter to a neutral position.

6. The valve assembly described in claim 3 including resilient means acting on said neutral piston for biasing its nose portion into engagement with said latch plate to shift the latter to a neutral position.

7. The valve assembly set forth in claim 1 including an exhaust fluid passage placing said one end of said neutral piston in fluid communication with a sump, whereby pressure fluid may be relieved from one end of said neutral piston.

8. The assembly as set forth in claim 7 including an orifice in said passage.

9. The valve assembly set forth in claim 1 further characterized in that said extendable valve spools also have a shoulder adjacent said tapered end for engagement by said latch plate to hold said extended spool captive in said latch plate.

10. The valve assembly described in claim 1 including resilient means acting on said neutral piston for biasing its nose portion into engagement with said latch plate to shift the latter to a neutral position.

11. A selector valve assembly comprising, a valve housing, a plurality of extendable valve spools mounted in said housing for directing pressure fluid to various outlets, a slideable latch plate in said housing and having an aperture adjacent the end of each of said shiftable spools, said spools each having a tapered end insertable through said spools' respective aperture in said plate when said spools are extended, means acting on and for resiliently biasing said latch plate to a position in which said apertures are not in complete registry with said spools and said plate engages and holds captive said extended spools, said latch plate having another aperture, a shiftable neutral piston having a nose portion adapted to enter said another aperture in said latch plate for forcing the latter to a neutral position against said biasing means where said latch plate apertures are in registry with their respective shiftable spools to thereby permit the said tapered ends to be withdrawn from said apertures in said latch plate, a neutral solenoid, a high pressure fluid passage means in said housing for providing pressure fluid to each of said shiftable spools, second passage means placing said high pressure passage means in fluid communication with one end of said neutral piston whereby pressure fluid acts to shift said neutral piston to said neutral position for said shifting of said latch plate, and shiftable valve means in said second passage means and operatively connected with said neutral solenoid for opening said second passage means to permit high pressure fluid to shift said neutral piston, and third passage means between said high pressure fluid passage means with the other end of said neutral piston to urge the latter to a position in which said neutral piston nose portion is withdrawn from said latch plate, and resilient means urging said neutral piston and its nose portion into engagement with said latch plate to shift the latter to a neutral position.

* * * * *